(12) United States Patent
Bird (10) Patent No.: US 8,005,685 B1
(45) Date of Patent: Aug. 23, 2011

(54) RANKING AIR TRAVEL SEARCH RESULTS BASED UPON USER CRITERIA

(75) Inventor: Charles G. Bird, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 1335 days.

(21) Appl. No.: 11/214,189

(22) Filed: Aug. 29, 2005

Related U.S. Application Data (60) Provisional application No. 60/690,531, filed on Jun. 13, 2005.

(51) Int. Cl.
*G06F 15/18* (2006.01)
(52) U.S. Cl. ........................................ 705/1.1
(58) Field of Classification Search ............... 705/1, 1.1
See application file for complete search history.

(56) References Cited

U.S. PATENT DOCUMENTS

| | | | |
|---|---|---|---|
| 5,732,398 A | 3/1998 | Tagawa | |
| 6,643,639 B2 * | 11/2003 | Biebesheimer et al. | 707/3 |
| 7,124,087 B1 * | 10/2006 | Rodriguez et al. | 705/1 |
| 2002/0173978 A1 * | 11/2002 | Boies et al. | 705/1 |
| 2003/0050846 A1 * | 3/2003 | Rodon | 705/26 |
| 2003/0069747 A1 * | 4/2003 | Strothmann et al. | 705/1 |
| 2004/0024653 A1 * | 2/2004 | Edgardo et al. | 705/26 |
| 2004/0128193 A1 * | 7/2004 | Brice et al. | 705/14 |
| 2004/0199429 A1 * | 10/2004 | Kwoh | 705/26 |
| 2004/0267595 A1 * | 12/2004 | Woodings et al. | 705/9 |
| 2005/0251440 A1 * | 11/2005 | Bednarek | 705/10 |
| 2006/0247954 A1 * | 11/2006 | Hunt | 705/5 |

* cited by examiner

*Primary Examiner* — Jamisue A Plucinski
*Assistant Examiner* — Shaun Sensenig
(74) *Attorney, Agent, or Firm* — Kilpatrick Townsend & Stockton LLP (57) ABSTRACT

A facility for ranking a list of priced alternatives is described. The facility attributes criteria to a user. The facility determines values for the criteria based on information about the user. The facility uses the determined values to adjust the actual prices of the priced options. The facility uses the adjusted prices to rank a list of options and presents them to a user.

27 Claims, 9 Drawing Sheets

|  |  | Actual Price | 1 Flight Time | Adjustment | 2 Layovers | Adjustment | Adjusted Price |
|---|---|---|---|---|---|---|---|
| 501 | L | 200 | 8 hr | 0 | TWO | 0 | 200 |
| 502 | 1 | 250 | 7 hr | - 40 x 1 | ONE | - 50 x 1 | 160 |
| 503 | 2 | 275 | 9 hr | + 40 x 1 | THREE | + 50 x 1 | 365 |
| 504 | 3 | 350 | 6 hr | - 40 x 2 | ONE | - 50 x 1 | 220 |
| 505 | 4 | 500 | 6 hr | - 40 x 2 | ONE | - 50 x 1 | 370 |
| 506 | 5 | 600 | 4 hr | - 40 x 4 | NONE | - 50 x 2 | 340 |
|  |  |  |  |  |  |  |  |

BEST AVAILABLE FLIGHT OPTIONS:

| DEPART | ARRIVE | FLIGHT TIME | LAYOVERS | CARRIER | PRICE |
|---|---|---|---|---|---|
| SEA 9:00 pm | EUR 7:00 am | 7 hr ☺ | 1 ☺ | A | $250 |
| SEA 9:00 am | JFK 8:00 pm | 8 hr | 2 | B | $200 |
| SEA 9:00 am | EUR 6:00 pm | 6 hr ☺ | 1 ☺ | A | $350 |
| SEA 9:00 am | EUR 4:00 pm | 4 hr ☺ | 0 ☺ | B | $600 |
| SEA 9:00 am | JKF 9:00 pm | 9 hr ☹ | 3 ☹ | C | $275 |
| SEA 9:00 am | LGA 6:00 pm | 6 hr ☺ | 1 ☺ | D | $500 |

RANKING AIR TRAVEL SEARCH RESULTS BASED UPON USER CRITERIA

CROSS-REFERENCE TO RELATED APPLICATION

This application claims the benefit of U.S. Provisional Application No. 60/690,531 entitled "RANKING AIR TRAVEL SEARCH RESULTS BASED ON USER CRITERIA," filed on Jun. 13, 2005, which application is hereby incorporated by reference in its entirety.

FIELD

The described technology is directed to the field of search tools.

BACKGROUND

The internet has become a valuable resource for people looking for options before purchasing travel, such as air travel. Many travel service providers (e.g., airlines, travel agencies, and online flight clearinghouses) offer travel services via web servers. Such services may include selecting and booking flights, checking departure and arrival times, reviewing mileage award status, and so on. To book a flight with an airline via the web, a traveler visits the reservation web page of the airline. The traveler then enters a departure city, destination city, departure date, and optionally other criteria such as class of service. The airline's web server identifies the airline's flights that match the criteria and presents the flights to the traveler. The flight information provided to the traveler typically includes the departure and arrival times, price, restrictions, number of layovers, and so on.

A traveler may search many airline websites before finding desirable flights. Online travel clearinghouses, such as Travelocity and Expedia, provide an interface to a traveler to search flight information provided by numerous carriers, consolidating the traveler's search to one convenient location. Many travelers will compare flights from competing airlines and purchase air travel based on which flights best meet their needs. For example, a traveler enters a departure city, destination city, departure and return dates, and performs a search for flights based on these criteria. The clearinghouse's web server identifies flights that match the criteria and presents the flights to the traveler. Often, the clearinghouse presents the traveler with a large number of flight options that can be burdensome for the traveler to review. Although the traveler can sort and re-sort the presented flight options based on the criteria (for example, showing flights options from least to most expensive), the traveler typically will spend a great deal of valuable time reviewing all of the available flight options before making a selection.

Travelers often consider many factors before purchasing flights. These factors may include cost, departure dates, time of departure and arrival, airport convenience, flight duration, carrier, and so on. Because flight options generally are presented one dimensionally (for example listed by price or carrier name), however, the traveler may review many undesirable flight options before finding an acceptable flight.

Therefore, it would be desirable for an airline or online clearinghouse to provide a system that considers a number of criteria before providing flight options to a traveler. It would also be desirable for a travel service provider or clearinghouse to provide a system that presents a useful and refined list of flight options to a traveler.

DETAILED DESCRIPTION

A facility for providing a ranked list of options, such as travel options like airline flights, based upon how a user may weigh certain factors favorably over others, is described. In some cases, options ranked by the facility are referred to as "alternatives."

In some embodiments, the facility ranks a list of priced travel options presented to a user. The facility generates a list of travel options and an actual price for each option. The facility determines values attributed to travel criteria (e.g. duration of travel, time of departure, and so on) by the user; that is, the facility determines the additional amount of money that the user would pay to have each criterion satisfied, or the amount of savings for which the user would be willing to forego satisfaction of the criterion. In some cases, the facility determines such absolute values based upon relative elasticities determined for each criterion. The facility uses the determined values to adjust the actual prices associated with each option. The facility then ranks the travel options based on the associated adjusted prices and presents them to the user.

In some embodiments, the facility uses information about a user's preferences to determine elasticities for the travel criteria for the user. The facility may obtain the information directly from the user (such as requesting the user to provide a value for a criterion), and/or may obtain the information from a historical database containing information about the user. For example, the facility may store information related to the user's selection of flights from previous search results and derive criterion valuations from this information. In some embodiments, the facility groups the user with other similar users (users sharing similar characteristics) and obtains information from a historical database containing information about the similar users. The facility may employ selection logic to decide the proper method of obtaining a user's preference information. For example, if a user does not provide values for the criteria, the facility may use selection logic to determine if there is sufficient historical information about the selected user to ascertain values for each criterion. If there is not sufficient historical information, the facility may look to a group of similar users to obtain sufficient historical information. In some embodiments, the facility employs more involved methods of selection, such as using algorithms that combine values based on the historical performance of selection methods.

Where the facility ranks search results in some or all the ways discussed above, it facilitates the search for desirable flights and provides a traveler with an incentive to purchase travel from the travel service provider or clearinghouse employing the facility.

Figure 1:
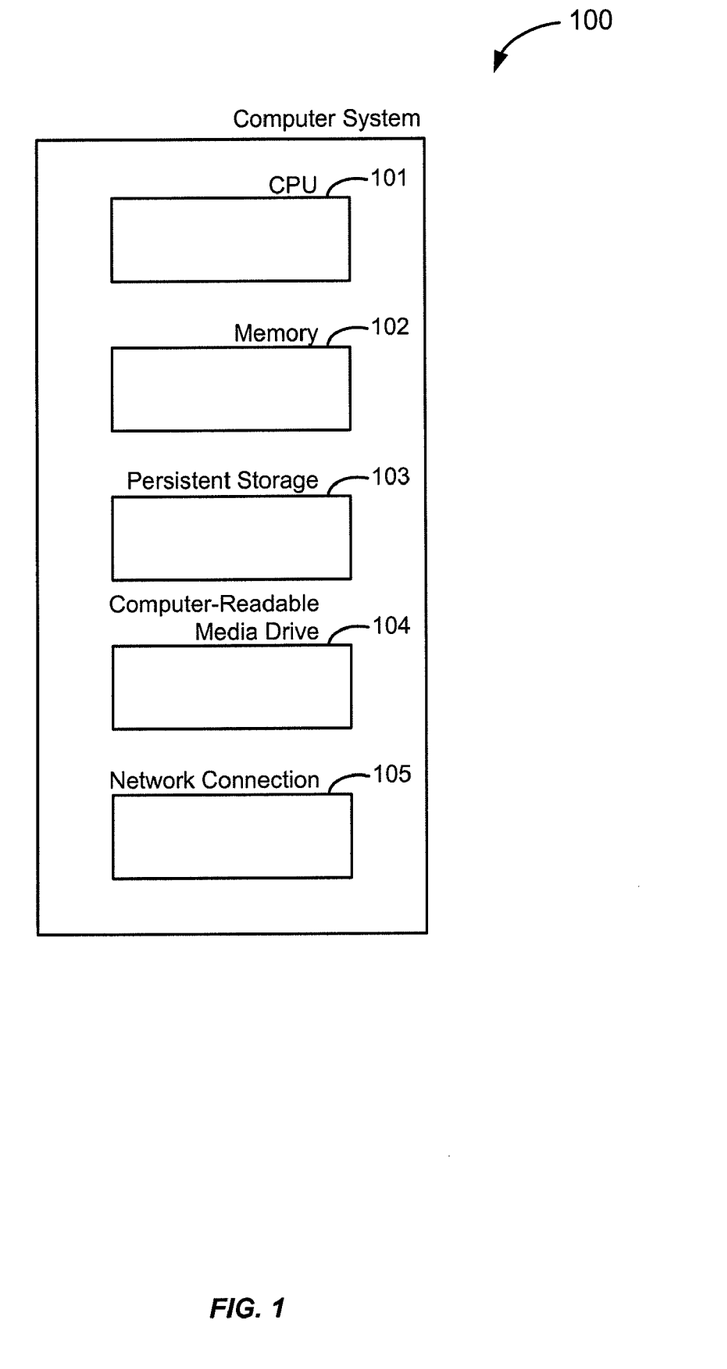
FIG. 1 is a high-level block diagram showing typical components of a computing system upon which the facility executes.

FIG. 1 is a high-level block diagram showing typical components of a computer system or other device upon which the facility executes. As shown in FIG. 1, the computer system 100 comprises a central processing unit (CPU) 101, input/output devices, and a computer memory (memory) 102. Among the input/output devices is a storage device 103, such as a hard disk drive; a computer-readable media drive 104, which can be used to install software products, including the facility, which are provided on a computer-readable medium, such as a CD-ROM; and a network connection 105 for connecting the computer system 100 to other computer systems (not shown). While the facility may be implemented on a computer system or other device configured as described above, those skilled in the art will recognize that it may also be implemented on computer systems and devices having different configurations.

Figure 2:
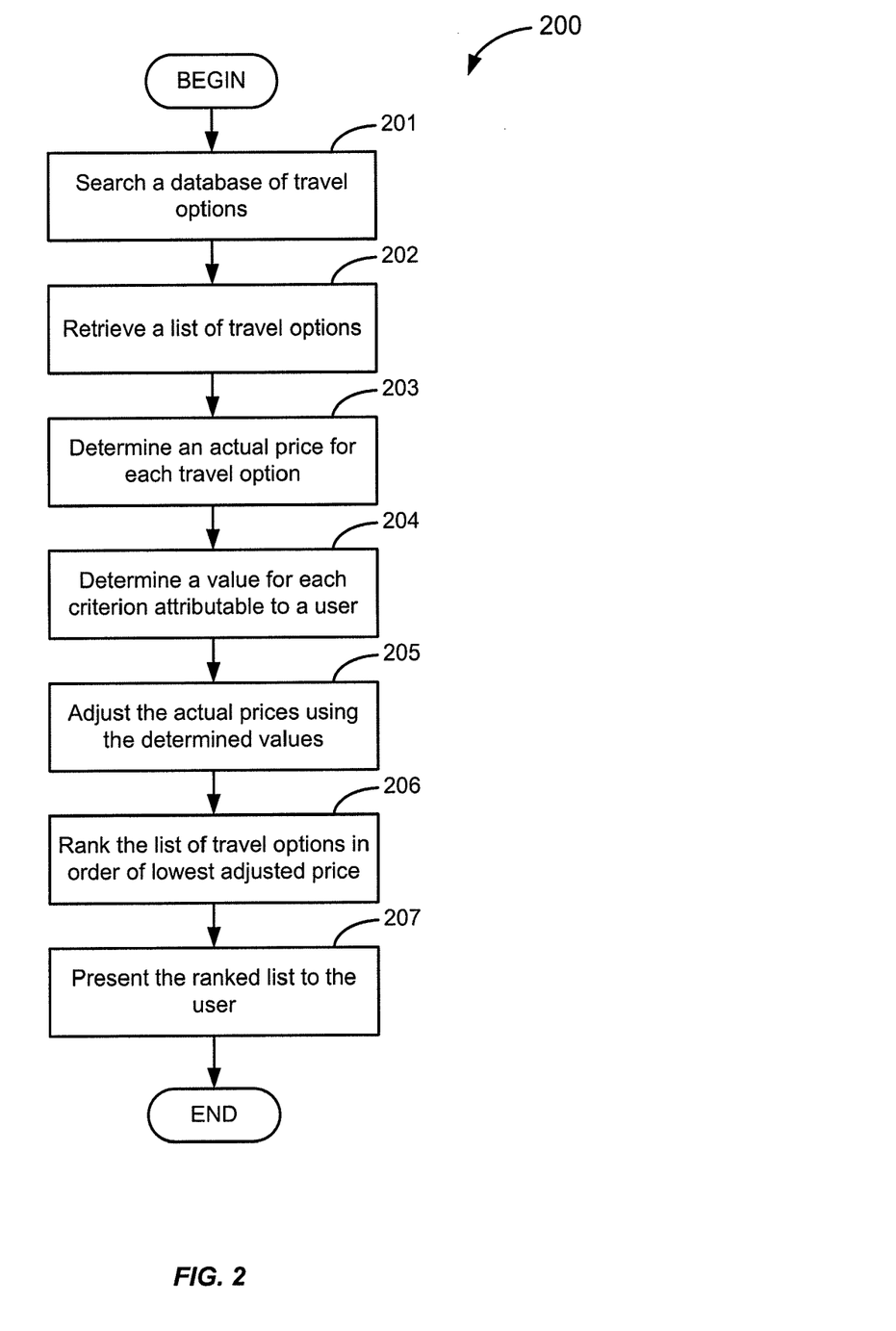
FIG. 2 is a flow diagram showing steps typically performed by the facility in order to generate a ranked list of options.

FIG. 2 is a flow diagram 200 showing steps typically performed by the facility in order to generate a ranked list of options. In step 201, the facility searches a database of travel options available to a selected user. In step 202, the facility retrieves a list of travel options for the selected user. In step 203, the facility determines an actual price for each travel option. The actual price of a travel option is an actual price for the travel option available to the user's facility, which may diverge from an actual price ultimately charged for the travel option. For example, the actual price could be an outdated actual price, or may omit "price add-ons" such as taxes or fees. In step 204, the facility determines a value for each criterion attributable to the selected user. The performance of step 204 is discussed further below in connection with FIG. 3. In step 205, the facility adjusts the actual prices of each of the travel options using the values determined in step 204. The performance of step 205 is discussed further below in connection with FIGS. 4 and 5. In step 206, the facility ranks the list of retrieved travel options in order of lowest adjusted prices. In step 207, the facility presents the ranked list of travel options to the selected user. After step 207, these steps conclude.

Figure 3:
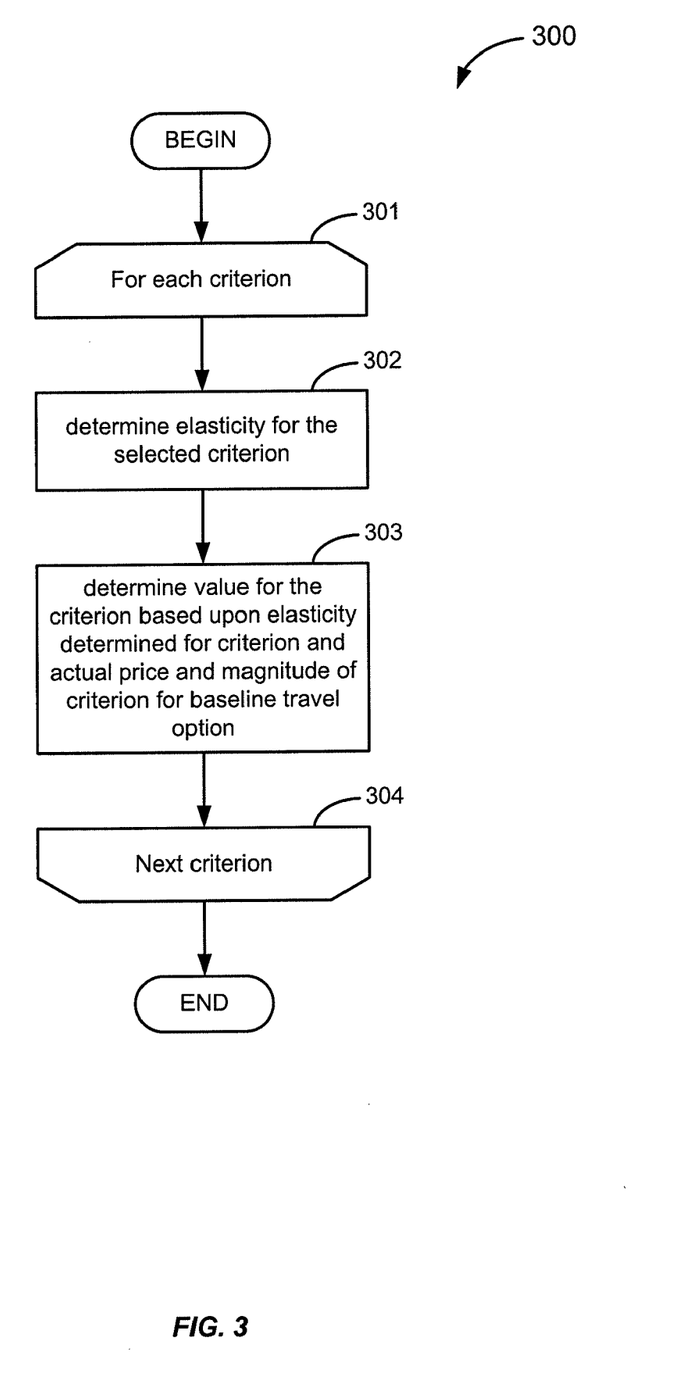
FIG. 3 is a flow diagram showing steps typically performed by the facility in order to determine a value for a selected criterion.

FIG. 3 is a flow diagram 300 showing steps typically performed by the facility in order to determine a value for a selected criterion. In steps 301-304, the facility loops through each criterion. In step 302, the facility determines an elasticity for the current criterion attributed to a selected user. In some embodiments, the elasticity is a relative measure, related to the value of a baseline option, that quantifies the "tradeoffs" a selected user makes when selecting options. In some cases, the facility asks a selected user how much they would be willing to pay to choose a flight that has, for example, a departure date specified by the selected user, and obtains an elasticity based on answers provided by the selected user.

A selected criterion may be any criterion a user might consider when deciding to purchase a certain flight, including price, time of departure, time of arrival, number of layovers, the flight service provider, time of duration, location of departure airport, location of arrival airport, location of seat, and so on.

In some cases, the facility reviews historical data for a selected user, and obtains an elasticity for the selected user based upon the historical data. For example, the facility contains the following data for M. Jones:

A. On Jan. 2, 2004, M. Jones chose a flight from Seattle to New York that was $420 and had a travel time of 9 hours. The lowest available flight option was $400 and had a travel time of 10 hours.

B. On Mar. 3, 2004, M. Jones chose a flight from Seattle to New York that was $480 and had a travel time of 6 hours. The lowest available flight option was $400 and had a travel time of 10 hours.

C. On December, 2004, M. Jones chose the lowest available flight option, which was $400 and had a travel time of 10 hours. The next lowest flight option was $500 and had a travel time of 8 hours.

In reviewing the earlier choices of a user, the facility may employ a number of different techniques to determine an elasticity. For example, the facility may employ a regression to determine the elasticity for each criterion. In this simplified example, the facility determines that user M. Jones spent 5 percent more ($20 over a cheaper option of $400) to take a flight with a flight time that was 10 percent shorter (1 hour less than the 10 hour time for the cheaper option) in example A, and spent 20 percent more ($80 over $400) to take a flight that was 40 percent shorter (4 hours less than the 10 hour time) in example B. The facility then determines that M Jones was not willing to spend 20 percent more ($100 more than the cheapest option of $400) to take a flight that was 20 percent shorter (2 hours shorter than the 10 hour flight) in example C. Therefore, the facility determines, using one of a variety of techniques, that M Jones is willing to spend 5 percent more for a flight that is 10 percent shorter, and assigns an elasticity of flight time to be −0.5.

In step 303, the facility determines a value for the current criterion by multiplying the determined elasticity by a ratio of the actual price of the lowest priced retrieved travel option (sometimes referred to as the "baseline" option) to a magnitude of the current criterion for the baseline option, such as the number of hours of the baseline option's flight time criterion. This can be shown as $$\text{value} = (\text{Elasticity}) \left( \frac{actualpriceofbaselineoption}{magnitudeofcurrentcriterion} \right).$$

For example, suppose the facility retrieves a list of available flight options for a selected user. Within the list, the lowest priced option (baseline) is a flight that costs $300 and has a flight time of 5 hours. The elasticity for flight time, the criterion, for a selected user is known to be −0.5 (the facility determines or has determined that the selected user is willing to spend 5 percent more above the baseline price for a 10 percent reduction in flight time, giving an elasticity of −0.5). Therefore, using the actual price ($300) and magnitude of the flight time (5 hours) for the baseline option, the facility calculates the value to be $$\$15/\text{hour} \left( \left( \frac{0.05}{0.10} \right) \left( \frac{\$300}{5 \text{hours}} \right) = \$15/\text{hour} \right).$$

This is the determined value for the criterion of flight time that the facility attributes to the selected user.

The facility determines the magnitude with a variety of techniques. In some cases such as the previous example, the magnitude is the quantity of the criterion (a magnitude for flight time would be the total time of the flight, e.g. 5 hours, 8 hours, etc.).

In some cases such as the following example, the facility assigns a magnitude to a criterion that ordinarily lacks a quantitative association (e.g. if the criterion is in-flight entertainment, the magnitude would relate to whether a flight provided such entertainment or not). For example, suppose the facility retrieves a list of available flight options for a selected user. Within the list, the lowest priced option (baseline) is a flight that costs $300 and does not have in-flight entertainment. The elasticity for in-flight entertainment, the criterion, for a selected user is known to be 0.15 (the facility determines or has determined that the selected user is willing to spend 15 percent more above the baseline price for in-flight entertainment, giving an elasticity of 0.15). Therefore, using the actual price ($300) for the baseline option, the facility calculates the value to be $45/in-flight entertainment. This is the determined value for the criterion of in-flight entertainment that the facility attributes to the selected user.

In step 304, if additional criteria remain to be processed, then the facility proceeds to step 403 to process the next criterion, else these steps conclude.

The facility utilizes preference information associated with a selected user to determine the elasticities and, subsequently, values for selected criteria. In various embodiments, the facility obtains preference information in different ways.

In some embodiments, the facility determines optimum values attributed to a selected user for each of the criteria. For some criteria, the facility already may apply established optimum values (e.g. a flight time of 0 hours) to all users. For some criteria, the facility may query a selected user for an optimum value (e.g. the facility may ask the user if they prefer smoking or non-smoking flights). For some criteria, the facility may glean optimum values from the initial search results for travel options (e.g. the user initially searches for flights with a departure time of 2:00 P.M.).

Figure 4:
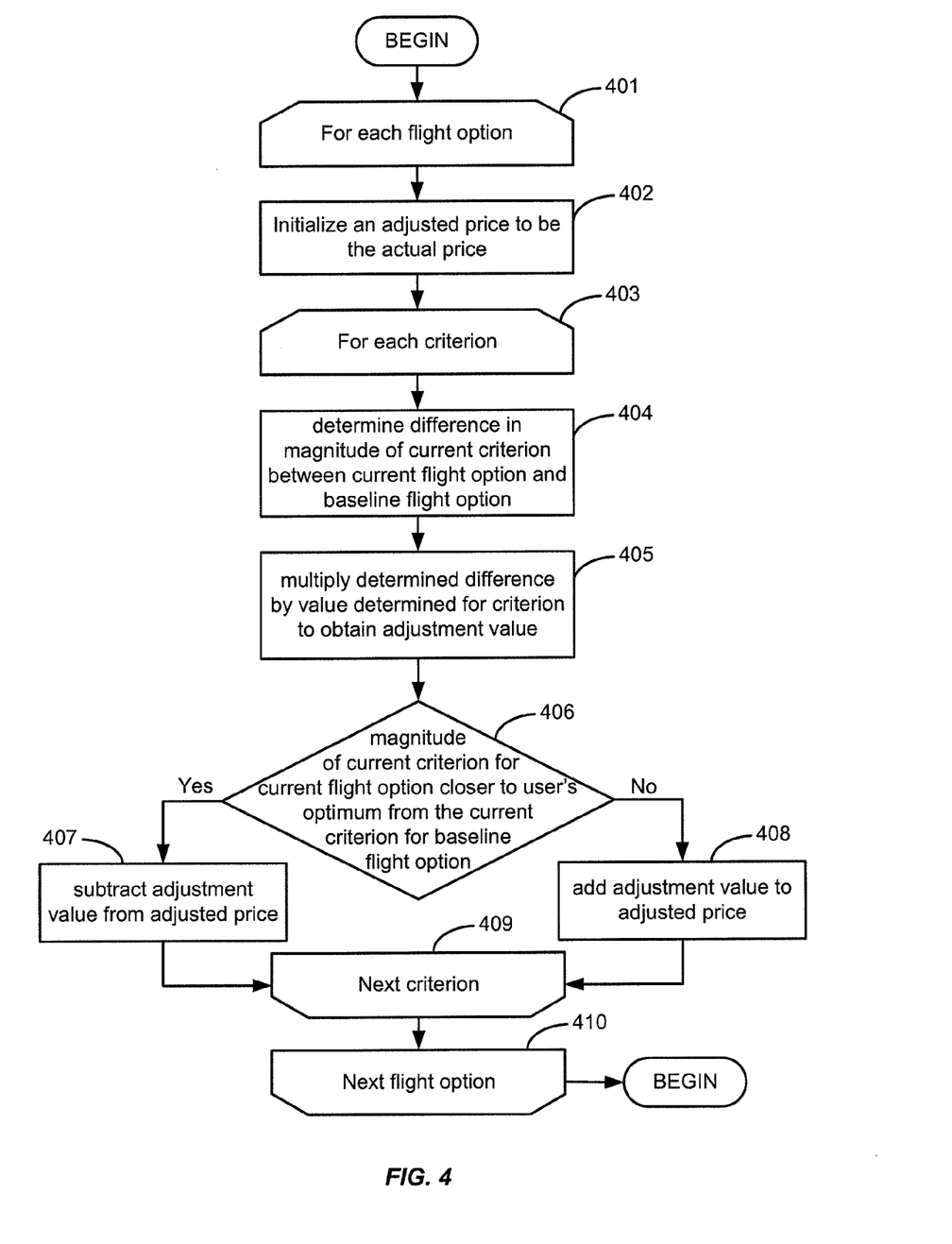
FIG. 4 is a flow diagram showing steps typically performed by the facility to determine an adjusted price for a flight option.

FIG. 4 is a flow diagram showing steps typically performed by the facility to determine an adjusted price for a flight option. In steps 401-410, the facility loops through each flight option. In step 402, the facility initializes an adjusted price for the current flight option to be equal to the actual price for the current flight option. In steps 403-409, the facility loops through each criterion. In step 404, the facility determines the difference in magnitude of the current criterion between the current flight option and the baseline flight option. In some cases, where there is no difference in the magnitude of the current criterion between the current flight option and the baseline flight option, the facility determines a value of 0 in step 404 and no adjustments are made to the adjusted price of the current flight option. In some cases, where the criterion is a binary criterion (e.g. the flight is smoking or non-smoking), in step 404 the facility determines a value of 1 if there is a difference between the current flight option and the baseline flight option and determines a value of 0 if there is no difference between the current flight option and the baseline flight option. In step 405, the facility multiplies the determined difference by the value determined for the current criterion to obtain an adjustment value. In step 406, if the magnitude of the current criterion for the current flight option is closer to the user's optimum than the current criterion for the baseline flight option, the steps proceed to step 407, else the steps proceed to step 408. In step 407, the facility subtracts the adjustment value of the current criterion from the adjusted price of the current flight option. In step 408, the facility adds the adjustment value of the current criterion to the adjusted price of the current flight option. In step 409, if additional criteria remain to be processed for the current flight option, then the facility proceeds to step 403 to process the next criterion, else the facility proceeds to step 410. In step 410, if additional flight options remain to be processed, then the facility proceeds to step 401 to process the next flight option, else these steps conclude.

Those skilled in the art will appreciate that the steps shown in any of FIGS. 2-4 may be altered in a variety of ways. For example, the order of the steps may be rearranged; substeps may be performed in parallel; shown steps may be omitted; or other steps may be included; etc.

Figure 5:
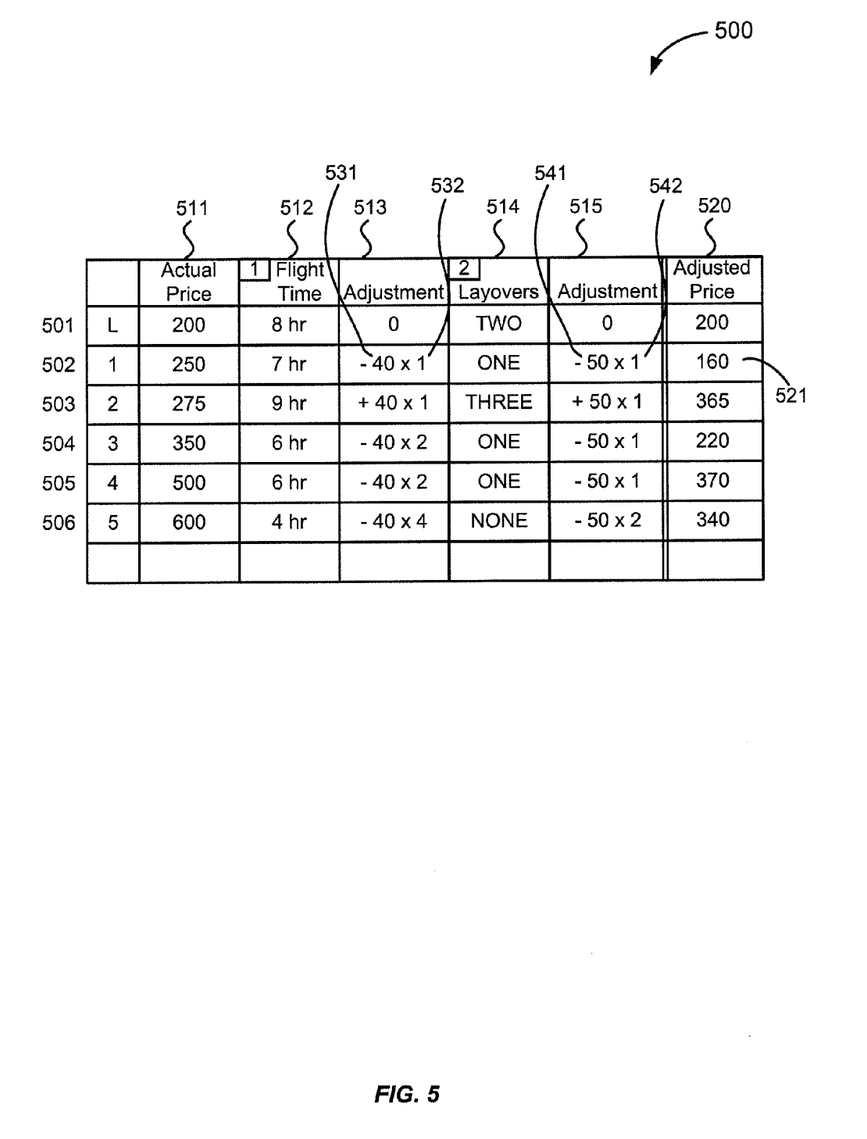
FIG. 5 is a table diagram showing an example illustrating how the facility calculates adjusted prices for the flight options.

FIG. 5 is a table diagram showing an example illustrating how the facility calculates adjusted prices for the flight options. The table is made up of rows, such as 501-506, each corresponding to a flight option returned by a flight option search. Those skilled in the art will appreciate that some tables will contain a significantly larger number of rows than table 500. Each row is divided into the following columns: an actual price column 511 containing the actual price of the flight option; a flight time column 512 containing the duration of the flight option ($1^{st}$ criterion); an adjustment column 513 for the $1^{st}$ criterion containing the value 531 of the $1^{st}$ criterion multiplied by the difference 532 in magnitude between the flight option and the baseline flight option; a layover column 514 containing the number of layovers for a flight option ($2^{nd}$ criterion); a second adjustment column 515 for the $2^{nd}$ criterion containing the value 541 of the $2^{nd}$ criterion multiplied by the difference 542 in magnitude between the flight option and the baseline flight option; and an adjusted price column 520 containing the adjusted price 521 of the flight option. Those skilled in the art will appreciate that some tables will contain larger or fewer numbers of columns than table 500.

The facility calculates an adjusted price for each flight option of FIG. 5 using the steps of FIG. 4. In the case of flight option 502, in step 401, the facility selects flight option 502. In step 402, the facility initializes the adjusted price to be the actual price 511 of $250. In a first iteration of step 404 for the $1^{st}$ criterion (flight time) 512, the facility determines the difference 532 in magnitude of the criterion between the current flight option and the baseline flight option (1 hour). In step 405, the facility multiplies the determined difference 532 by the value 531 determined for the criterion ($40) to obtain an adjustment value ($40/hour×1 hour=$40). In step 406, the facility determines that the magnitude of the current criterion for the current flight option (7 hours) is closer to the user's optimum value (0 hours) than the magnitude of the current criterion for the baseline flight option (8 hours) and proceeds to step 407. In step 407, the facility subtracts the adjustment value from the adjusted price ($250-$40=$210) and obtains a new adjusted price ($210). In step 409, the facility determines that additional criteria are to be processed, and proceeds to step 403.

In a second iteration of step 404 for the $2^{nd}$ criterion (layovers) 514, the facility determines the difference 532 in magnitude of the criterion between the current flight option and the baseline flight option (1 layover). In step 405, the facility multiplies the determined difference 532 by the value 531 determined for the criterion ($50) to obtain an adjustment value ($50/layover×1 layover=$50). In step 406, the facility determines that the magnitude of the current criterion for the current flight option (1 layover) is closer to the user's optimum value (0 layovers) than the magnitude of the current criterion for the baseline flight option (2 layovers) and proceeds to step 407. In step 407, the facility subtracts the adjustment value from the adjusted price ($210-$50=$160) and obtains a new adjusted price ($160). In step 409, the facility determines that there are no more criteria to process, and proceeds to step 410. The processing is compete for flight option 502 and returns an adjusted price of $160.

While FIG. 5 and the table diagram discussed below show a table whose contents and organization are designed to make them more comprehensible by a human reader, those skilled in the art will appreciate that actual data structures used by the facility to store the information may differ from the table, shown, in that they, for example, may be organized in a different manner; may contain more or less information than shown; may be compressed and/or encrypted; etc.

Figure 6:
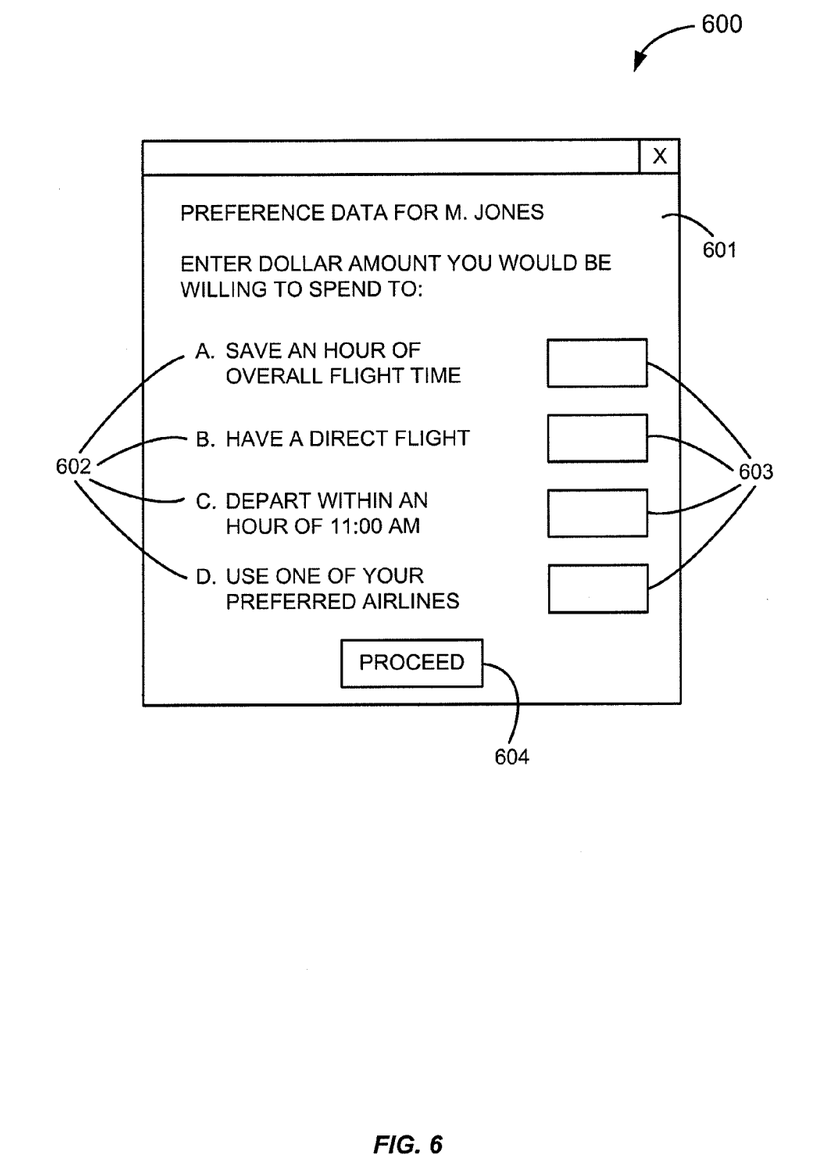
FIG. 6 is a screenshot diagram showing a user preference retrieval page.

In some embodiments, the facility determines a selected user's preferences by directly soliciting them from the user. FIG. 6 is a screenshot diagram showing a user preference retrieval page. The facility utilizes display 600 to receive a selected user's preferences regarding selected criteria, and determines the values for the selected criteria based upon input provided by the user. The display includes information about the selected user 601. The display prompts the user to value selected criteria. For example, the display includes questions 602 such as "Enter dollar amount you would be willing to spend to save an hour of overall flight time:". The display includes fields 603 to accept entry of the valulations from the user. The display includes a button 604 to return the user's valuations to the facility.

In some embodiments, the facility obtains preference information from a historical database containing information related to the user. This information includes: information related to travel options previously selected by the user; information related to travel options not previously selected by the user; information related to the preference of criteria over others; etc. One skilled in the art will appreciate that the facility can utilize a variety of information associated with a selected user in order to determine preference information for the selected user.

In some embodiments, the facility obtains preference information for a selected user from a historical database of users similar to the selected user. In particular, in some embodiments, the facility determines a selected user's preferences by equating the preference information of a group of similar users with the selected user. The facility may determine the preference information before or after the facility performs a query of available flight options to the selected user.

Figure 7A:
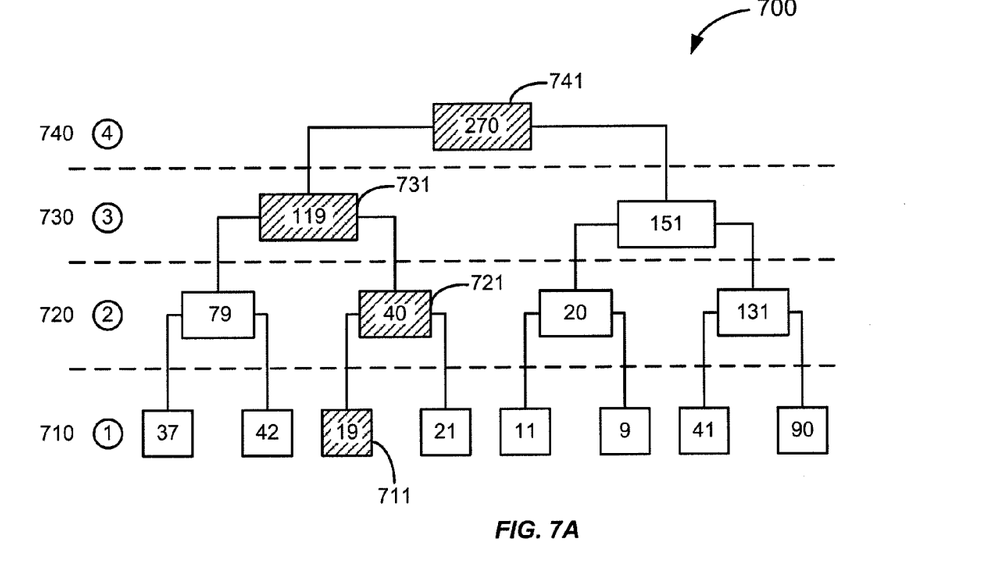
FIG. 7A is a tree diagram showing typical components of a multilevel analysis system used to select a similar group of users in order to determine a user's preferences.

FIG. 7A is a tree diagram showing typical components of a multilevel analysis system used to select a similar group of users in order to determine a selected user's preferences. The tree 700 is made up of nodes each corresponding to a group of similar users, each of the similar users contributing one or more data points to the node. A data point can be an occasion where a similar user chose an option from a list of available options. For example, the facility may have information about a similar user indicating the user searched and chose flights on seven occasions. In this example, the user would contribute seven data points. The nodes of the tree diagram are arranged into levels 710, 720, 730, 740. For example, the users in group 741 within a higher level 740 share a few characteristics, while the users in group 711 within a lower level 710 share many characteristics.

Figure 7B:
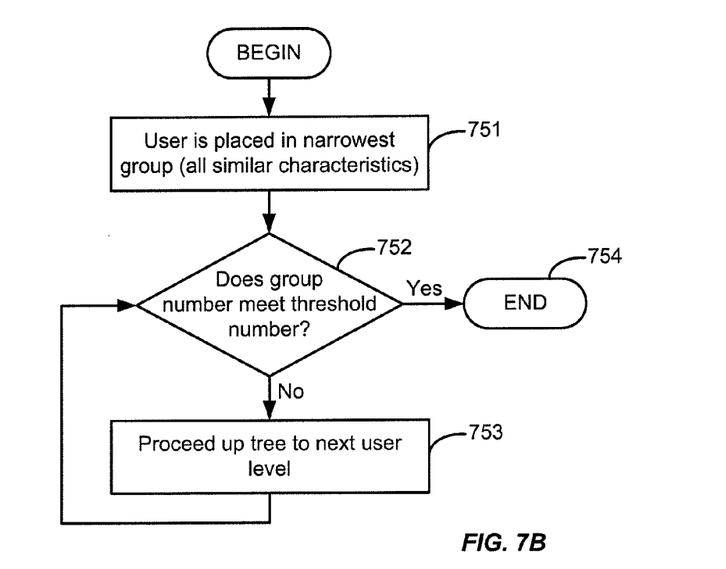
FIG. 7B is a flow diagram showing steps typically performed by the facility to select a similar group of users in order to determine a user's preferences.

FIG. 7B is a flow diagram showing steps typically performed by the facility to select a similar group of users in order to determine a user's preferences. In step 751, the facility places the user into a narrow group of similar users 711 sharing many characteristics. In step 752, the facility determines the number of data points derived from similar users in the group containing the selected user and compares that number with a "threshold" number, i.e. a statistically significant number of data points needed to determine preference information for the selected user. If the number of data points in the group containing the selected user is equal to or above a threshold number, the steps conclude, else the facility proceeds to step 753. In step 753, the facility places the user in the group immediately above the current group 721. The steps continue until the user is placed in a group containing at least the threshold number of data points.

For example, if the threshold number in this example was 100 data points, the facility would proceed until the user was placed in group 731, because the group contains 119 data points, which is above the threshold number of 100 data points.

While the tree diagram of FIG. 7A and the flow diagram of 7B are designed to make the analysis more comprehensible by a human reader, those skilled in the art will appreciate that they are representational of multilevel analysis processes, and the facility may employ other techniques, such as regression analysis, etc., in order to obtain a statistically significant number of data points.

Figure 8:
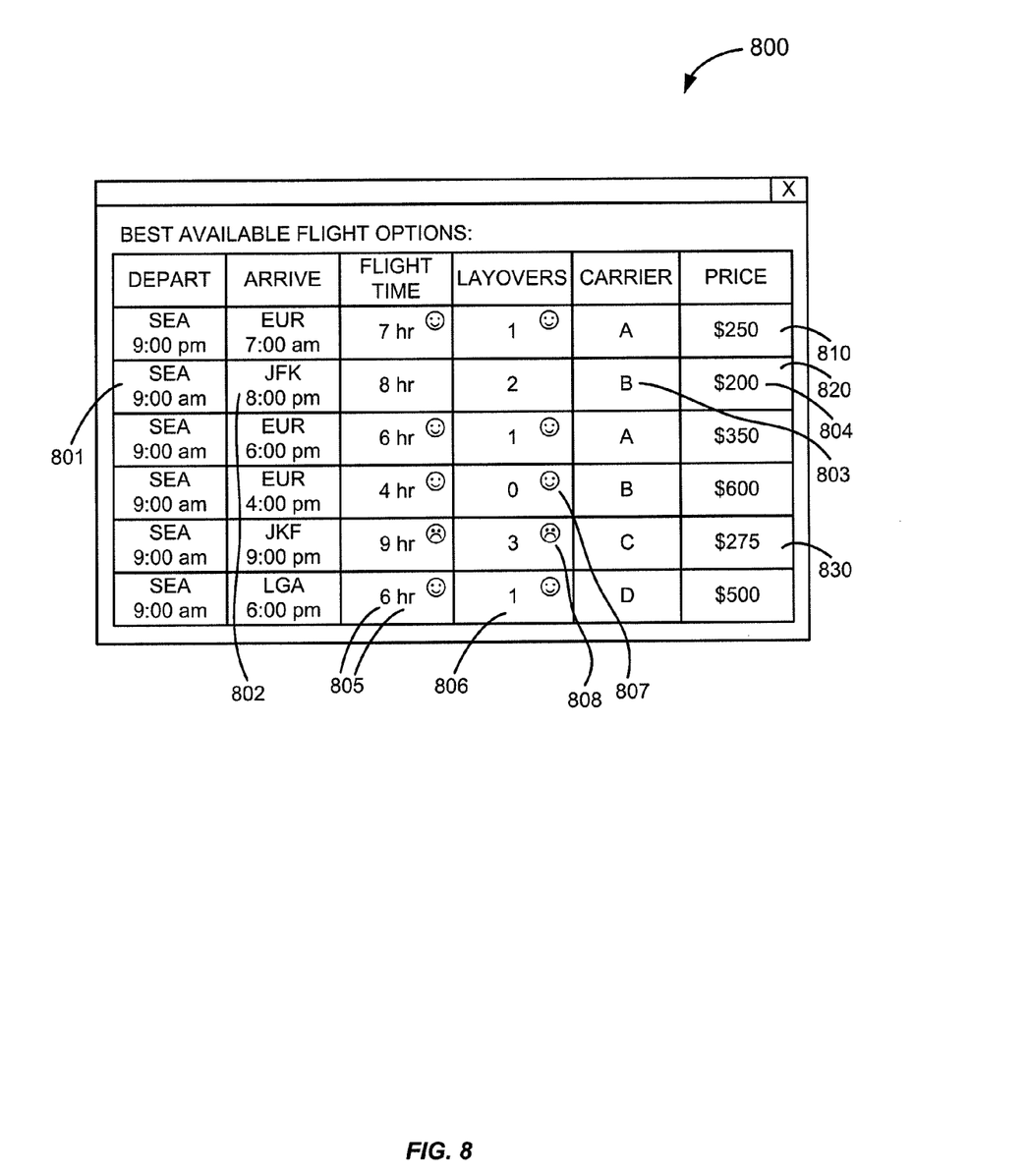
FIG. 8 is a screenshot diagram showing ranked options presented to a user.

FIG. 8 is a screenshot diagram showing ranked options presented to a user. Display page 800 indicates typical flight information, such as departure time 801, arrival time 802, carrier 803, price 804, flight time 805 and number of layovers 806. As shown, the facility ranks flight 810 above flight 820, despite the lower price of flight 820. The display includes other elements, such as indica 807 and 808 showing if a flight satisfies a user's preferences for a selected criterion.

Figure 9:
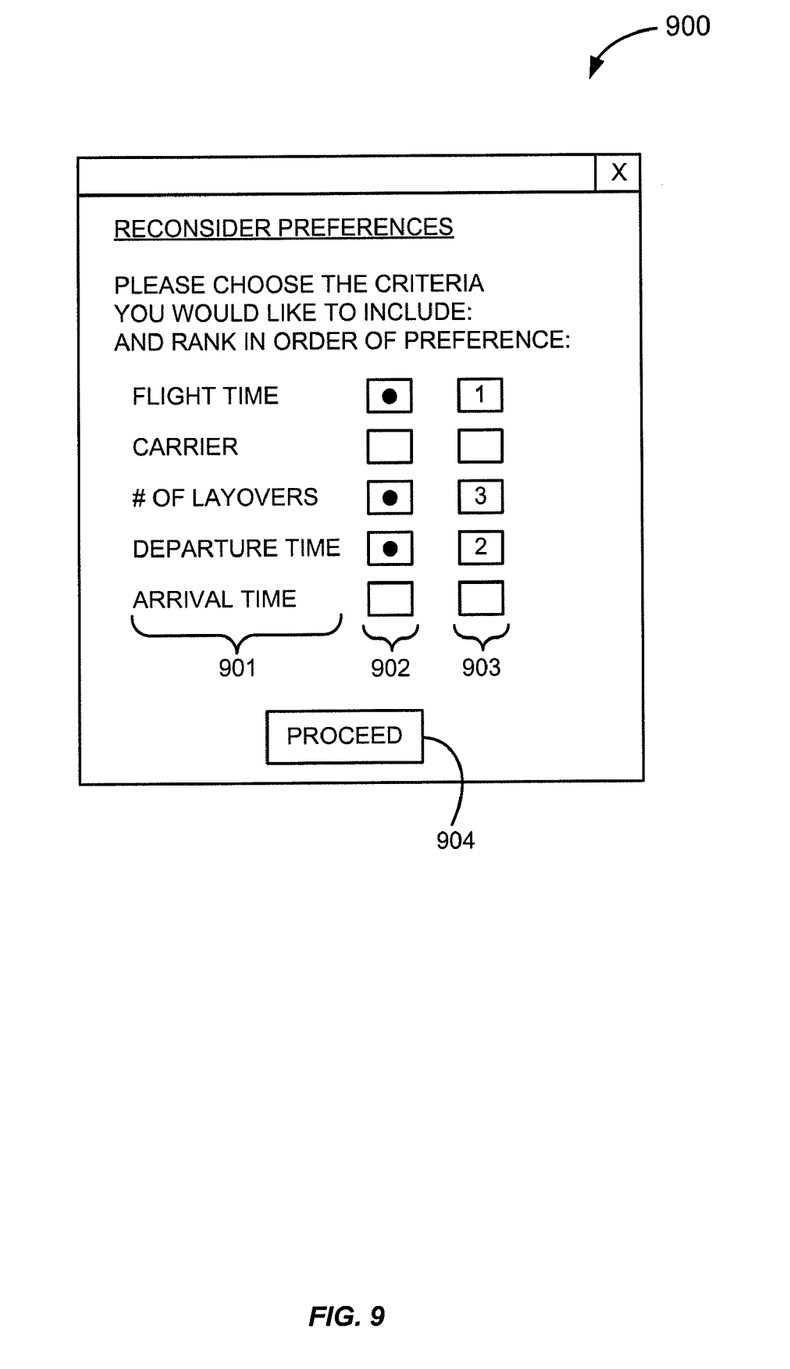
FIG. 9 is a screenshot diagram showing a user preference selection page.

FIG. 9 is a screenshot diagram showing a user preference selection page. In some embodiments, the facility displays page 900 to allow a user to select and weight the criteria 901 a selected user wishes to be considered in ranking retrieved flight options. In particular, the page contains user interface controls 902 that the user may use to select some of the criteria for use in ranking retrieved flight options, as well as user-interface controls 903 that the user may use to specify an importance weighting for each of the selected criteria. The page further includes a proceed button 904 that the user may select in order to rank the retrieved flight options in accordance with the selected criteria and the weightings specified for them by the user.

Those skilled in the art will appreciate that the layout and buttons shown in FIG. 9 are for illustrative only and that the facility may employ a variety of different user interface controls (such as drop down menus, etc.) that accommodate user interaction and are configured to receive user selections.

It will be appreciated by those skilled in the art that the above-described facility may be straightforwardly adapted or extended in various ways. For example, the facility may be used to rank alternatives not associated with travel. The facility may be utilized in advance of a user's query for travel options or after the facility retrieves a list of travel options. Additionally, references identified by the facility may be displayed or used in a variety of ways. While the foregoing description makes reference to particular embodiments, the scope of the invention is defined solely by the claims that follow and the elements recited therein.

I claim:

1. A computer-implemented method for ranking a list of travel options for a selected user, comprising:
   determining a plurality of selected travel preferences attributable to the selected user;
   for each of the plurality of selected travel preferences attributable to the selected user, determining, using a computer, a pecuniary value for the selected travel preference based at least in part on historical travel data related at least to the selected user or one or more users similar to the selected user to which the selected travel preference applies;

determining actual prices for a plurality of travel options;

for each of the plurality of travel options, adjusting the actual price determined for the travel option based at least in part on the determined pecuniary values for one or more of the selected travel preferences attributable to the selected user to obtain an adjusted price; and ranking each of the plurality of travel options based at least in part on the adjusted prices of the travel options.

2. The method of claim 1 wherein determining values includes obtaining preference information directly from the selected user.

3. The method of claim 1, further comprising identifying the plurality of travel options in response to receiving a query from the selected user, wherein the obtained information is obtained in advance of receiving the query.

4. The method of claim 1, further comprising identifying the plurality of travel options in response to receiving a query from the selected user, wherein the obtained information is dynamically generated for the selected user in response to receiving the query.

5. The method of claim 1, further comprising performing a multilevel statistical analysis on a population of users to identify the plurality of users similar to the selected user.

6. The method of claim 5 wherein the multilevel statistical analysis is performed until it identifies a satisfactory number of users similar to the selected user.

7. The method of claim 1, wherein determining values further comprises obtaining information until a statistically significant number of data points related to the selected user is obtained.

8. The method of claim 1, further comprising, before determining values for each of a plurality of selected preferences attributable to the selected user, performing a search of available travel options within a database of available travel options.

9. The method of claim 8 wherein the determined values are used to adjust actual prices for travel options produced by each of a plurality of searches performed by the selected user.

10. The method of claim 8 wherein the values determined for each of a plurality of selected travel preferences attributable to the selected user are determined for each search performed by the selected user.

11. A computer-implemented method for ranking a list of travel options for a selected user, comprising:

Determining a selected preference attributable to the selected user based at least in part on historical travel data related at least to the selected user or one or more users similar to the selected user to which the selected preference applies;

determining, using a computer, a pecuniary value for the selected preference;

determining actual prices for a plurality of alternatives;

for each of the plurality of the alternatives, adjusting the actual price determined for the alternative based at least in part on the determined pecuniary value the selected preferences attributable to the selected user to obtain an adjusted price; and ranking each of the plurality of alternatives based at least in part on the adjusted prices.

12. A computing system for ranking a list of travel options available to a selected user, comprising:

a travel option generation subsystem that generates a list of travel options based at least in part on at least one of a plurality of travel criteria selected by the selected user and associates an actual price to each of the travel options;

a value determination subsystem that determines a pecuniary value for at least each of the selected plurality of selected travel criteria, the determining based at least in part on historical data to which the selected travel criterion applies;

a price adjustment subsystem that adjusts the actual price associated with each of the travel options based at least in part on the determined pecuniary values for one or more of the selected travel criteria attributable to the selected user; and a ranking subsystem that ranks the travel options based at least in part on the associated adjusted prices.

13. The computing system of claim 12, further comprising:

a presentation subsystem that presents the ranked travel options to the selected user according to the lowest associated adjusted price.

14. The computing system of claim 12, wherein the value determination subsystem determines a value by obtaining preference information directly from the selected user.

15. The computing system of claim 12 wherein the value determination subsystem determines a value by obtaining information from a historical database containing preference information associated with the selected user.

16. The computing system of claim 12 wherein the value determination subsystem determines the pecuniary value at least in part by obtaining information from a historical database containing preference information associated with a plurality of users similar to the selected user.

17. The computing system of claim 12 wherein the value determination subsystem determines a value by selecting at least one method from a plurality of available methods of obtaining information about the selected user.

18. The computing system of claim 12 wherein the type of each of the plurality of selected travel criteria is chosen from a group including price, time of departure, time of arrival, time of duration, and travel service provider.

19. The computing system of claim 12, wherein the travel options are flight options, and the type of each of the plurality of selected travel criteria is chosen from a group including price, time of departure, time of arrival, number of layovers, flight service provider, time of duration, location of departure airport, location of arrival airport, and location of seat.

20. The computing system of claim 13, wherein the presentation subsystem presents choices to the selected user to allow the selected user to choose one or more of the travel criteria used in determining the adjusted prices.

21. One or more computer systems configured with executable instructions that are executed to, at least, access a data structure representing a list of ranked alternatives ranked for a selected user, the data structure comprising a plurality of alternatives, each alternative including information identifying a travel option and information indicating an adjusted price, the adjusted price reflecting an actual price for the travel option that has been adjusted by pecuniary values for each of a plurality of selected criteria based at least in part on historical travel by the selected user.

22. The one or more computer systems of claim 21, wherein each of the plurality of alternatives further includes information indicating an actual price.

23. A computer-readable medium whose contents include executable instructions that are executed to cause a computing system to perform a method of obtaining a list of travel options to a selected user, the method comprising:

determining a plurality of selected travel preferences attributable to the selected user;

for each of the plurality of selected travel preferences attributable to the selected user, determining a pecuniary value for the selected travel preference based at least in part on historical travel data related at least to the selected user or one or more users similar to the selected user to which the selected travel preference applies;

searching a database of available travel options based at least in part on the determined pecuniary value for one or more of the selected travel preferences attributable to the selected user;

selecting a plurality of travel options based at least in part on the determined pecuniary values; and     presenting a list of selected travel options to the selected user.

24. One or more computer systems collectively configured with executable instructions that when executed, at least, access a data structure representing a list of price elasticities determined for a selected user, the data structure comprising a plurality of price elasticities, each price elasticity associated with a travel criterion and determined based at least in part on historical travel by the selected user, reflecting the selected user's valuation of the travel criterion.

25. The one or more computer systems of claim 24, wherein the obtained information contains preference information associated with the selected user.

26. The one or more computer systems of claim 24, wherein the obtained information contains preference information associated with a plurality of users similar to the selected user.

27. The one or more computer systems of claim 24, wherein the data structure further contains price elasticities for a plurality of users other than the selected user.

\* \* \* \* \*